(12) United States Patent
Karlsson

(10) Patent No.: US 11,336,769 B2
(45) Date of Patent: May 17, 2022

(54) METHOD, RECEIVING INTERFACE, COMPUTER PROGRAM AND COMPUTER PROGRAM PRODUCT FOR GROUPING INCOMING ALARM CALLS

(71) Applicant: SKYRESPONSE AB, Stockholm (SE)

(72) Inventor: David Karlsson, Luleå (SE)

(73) Assignee: SKYRESPONSE AB, Stockholm (SE)

( * ) Notice: Subject to any disclaimer, the term of this patent is extended or adjusted under 35 U.S.C. 154(b) by 0 days.

(21) Appl. No.: 17/279,049

(22) PCT Filed: Oct. 2, 2019

(86) PCT No.: PCT/SE2019/050952
§ 371 (c)(1),
(2) Date: Mar. 23, 2021

(87) PCT Pub. No.: WO2020/071987
PCT Pub. Date: Apr. 9, 2020

(65) Prior Publication Data
US 2021/0314443 A1  Oct. 7, 2021

(30) Foreign Application Priority Data
Oct. 5, 2018 (SE) .................................. 1851204-6

(51) Int. Cl.
*H04M 3/51* (2006.01)
*H04M 3/42* (2006.01)
(Continued)

(52) U.S. Cl.
CPC ..... *H04M 3/5116* (2013.01); *H04M 3/42042* (2013.01); *H04M 3/42059* (2013.01);
(Continued)

(58) Field of Classification Search
CPC .......... H04M 3/5116; H04M 3/42042; H04M 3/42059; H04M 3/5191; H04M 3/42348;
(Continued)

(56) References Cited

U.S. PATENT DOCUMENTS 8,744,399 B2 * 6/2014 Smith .................. G08B 25/014
455/404.1
8,886,153 B2 * 11/2014 Velusamy ............. H04W 4/023
455/404.1
(Continued)

FOREIGN PATENT DOCUMENTS

CN        106936620 A      7/2017
WO     WO 2017052342 A1    3/2017

*Primary Examiner* — Lisa Hashem
(74) *Attorney, Agent, or Firm* — James S. Keddie; Bozicevic, Field & Francis LLP

(57) ABSTRACT

The following disclosure provides a method and a receiving interface device (200) configured to perform the method for grouping received alarm calls generated by or in connection to the same alarm event, wherein said alarm call being a voice call or/and data/text message. The receiving interface device is a part of an Alarm Receiving Centre (100) for enabling the reception of alarm call alarm calls sent by means of VoIP or SIP, and wherein said receiving interface device comprises said device comprising a processor in a processing circuitry (210) being operative to perform the steps of the method.

10 Claims, 6 Drawing Sheets

(51) Int. Cl.
*H04W 76/50* (2018.01)
*H04W 4/90* (2018.01)
*H04W 76/40* (2018.01)
*H04W 4/08* (2009.01)

(52) U.S. Cl.
CPC ..... *H04M 3/42348* (2013.01); *H04M 3/5191* (2013.01); *H04W 4/08* (2013.01); *H04W 4/90* (2018.02); *H04W 76/40* (2018.02); *H04W 76/50* (2018.02)

(58) Field of Classification Search
CPC ....... H04W 4/08; H04W 76/40; H04W 76/50; H04W 4/90
See application file for complete search history.

(56) References Cited

U.S. PATENT DOCUMENTS

| | | | |
|---|---|---|---|
| 9,112,700 B2 * | 8/2015 | Link, II | H04L 9/3247 |
| 9,503,577 B1 | 11/2016 | Bendi et al. | |
| 10,470,024 B2 * | 11/2019 | Meredith | H04M 3/42059 |
| 2007/0287430 A1 * | 12/2007 | Hosain | H04M 11/002 |
| | | | 455/414.1 |
| 2012/0068842 A1 | 3/2012 | Piccolo, III | |
| 2012/0250834 A1 | 10/2012 | Smith et al. | |
| 2013/0188526 A1 * | 7/2013 | Cooper, Jr | H04M 3/5116 |
| | | | 370/259 |
| 2020/0175843 A1 * | 6/2020 | Aslam | H04W 4/025 |
| 2020/0258374 A1 * | 8/2020 | Mehta | G08B 25/016 |
| 2021/0209932 A1 * | 7/2021 | Olds | G08B 26/004 |

* cited by examiner

METHOD, RECEIVING INTERFACE, COMPUTER PROGRAM AND COMPUTER PROGRAM PRODUCT FOR GROUPING INCOMING ALARM CALLS

CROSS-REFERENCE TO RELATED APPLICATIONS

This application is a § 371 national phase of International Application No. PCT/SE2019/050952, filed on Oct. 2, 2019, which claims the benefit of Swedish Patent Application No. 1851204-6, filed on Oct. 5, 2018, which applications are incorporated by reference herein.

TECHNICAL FIELD

The present technology relates to a method and a device of an alarm receiving center.

BACKGROUND

Many Alarm Receiving Centers (ARC) for personal safety or care are based on technology that expects alarm events to be sent in as two parts. One with data and one with a voice call. The data parts generally minimally consist of who have trigged the alarm and what has happened. Additional information like position, text message and such are sometimes added.

There are an escalating number of alarm devices on the market. Said devices are utilized by broader groups of people and on a much higher requirement on short time from purchase to fully functional. Many ARC software are not possible to add and remove subscribers without manual steps making it impractical to turn to a broader customer groups that is used to buy a device or service and have it functional within minutes even on weekends.

Also the new type of devices in IOT are often not capable of doing telephone calls in PSTN (Public Switched Telephone Network), but are able to establish voice call over IP, VoIP, for example SIP or other VoIP technologies. The communication of the data part are also evolving quicker than the ARC software installations manage, making it hard for modern devices to connect to older installations of ARC software.

Further, the ARC software license models are often focused on number of subscribers, potentially making the business case for cheap subscriptions for large number of subscribers not feasible.

SUMMARY

One object of the following disclosure is to present solutions of the problems of adapting old alarm receiving equipment of an Alarm Receiving Center, ARC, to more modern alarm sending devices.

According to one aspect of a provided solution, a method and embodiments of said method are disclosed, wherein said method is configured for grouping received alarm calls generated by or in connection to the same alarm event. Said alarm call is a voice call or/and data/text message, and said method is performed by an Alarm Receiving Centre, ARC, for enabling the reception of alarm calls sent by means of VoIP or SIP. Said method comprises the steps of receiving an alarm call, assigning an identified ARC Subscriber Identity to the alarm call, and checking if said ARC Subscriber Identity is already active by a current alarm call. If subscriber Identity is not active, i.e. in use; the method continues by creating a group and an alarm event docket, said group and docket being identified by the ARC Subscriber Identity. If the ARC Subscriber Identity is in use, the method continues by adding the alarm call to the group and corresponding alarm event docket identified by the ARC Subscriber Identity, and forwarding the group and alarm event docket by using the ARC Subscriber Identity to ARC staff/operator presentation unit GUI via a PSTN connection by means of the ARC Subscriber Identity.

According to another aspect of a provided solution, a receiving interface device and embodiments of said device are disclosed, wherein said device is configured to perform a method for grouping received alarm calls generated by or in connection to the same alarm event, wherein said alarm call is a voice call or/and data/text message. Said receiving interface device being a part of an Alarm Receiving Centre, ARC, for enabling the reception of alarm calls sent by means of VoIP or SIP. Said receiving interface device comprises said device comprising a processor in a processing circuitry is operative to perform the steps of the method configured for grouping received alarm calls generated by or in connection to the same alarm event.

According to another aspect of a provided solution, a computer program comprises computer program code which, when run in a processor of a receiving interface device being a part of an Alarm Receiving Centre, ARC, causes the ARC to perform the steps of the method configured for grouping received alarm calls generated by or in connection to the same alarm event.

According to another aspect of a provided solution, a computer program product storing a computer program comprising computer program code which, when run in a processor of a receiving interface device being a part of an Alarm Receiving Centre, ARC, causes the ARC to perform the steps of the method configured for grouping received alarm calls generated by or in connection to the same alarm event.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
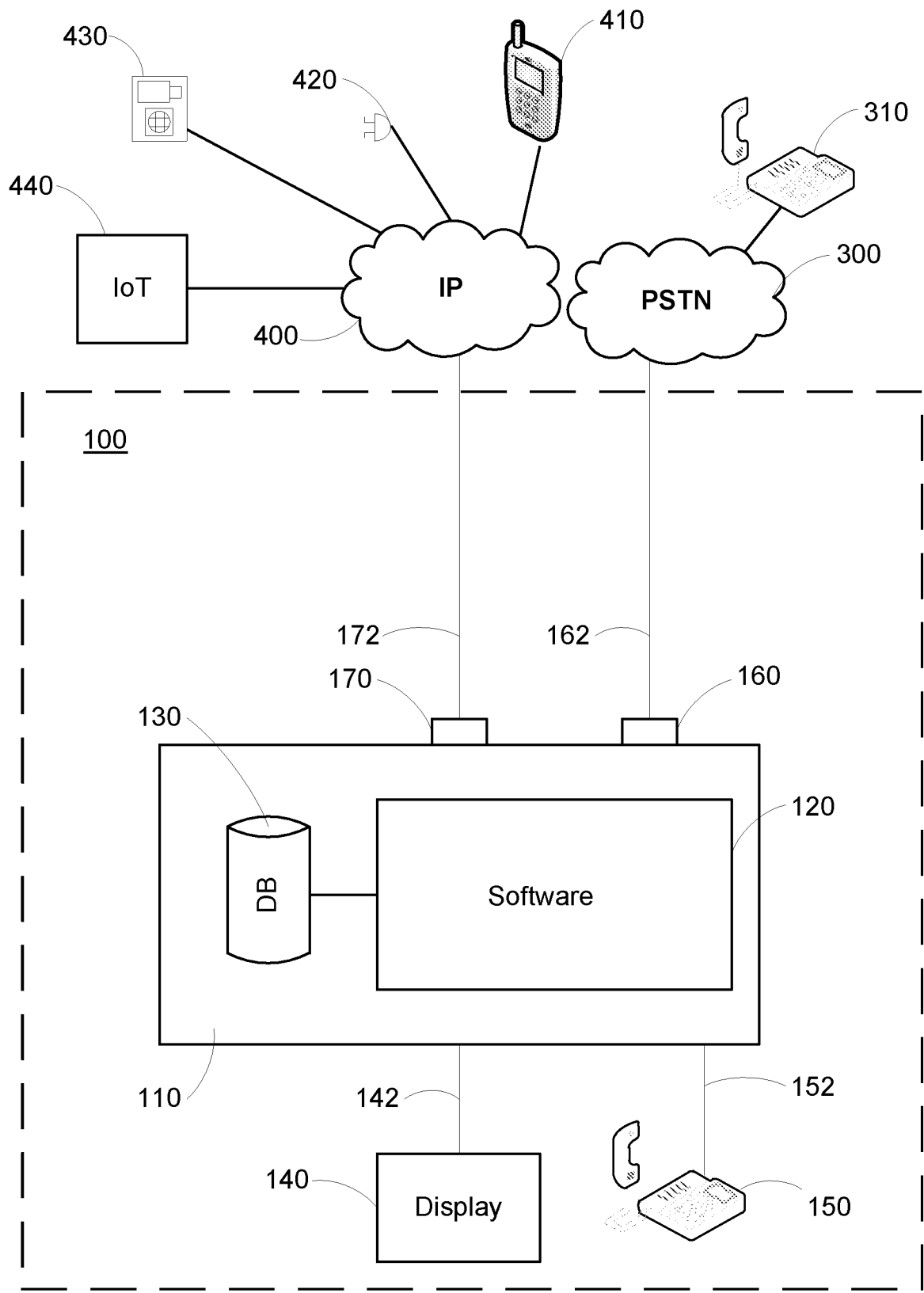
FIG. 1 is a block diagram of an alarm receiving center according to prior art.

FIG. 1 is a schematic illustration of an old fashioned alarm receiving center.

The Alarm Receiving Center (ARC) 100 comprises a central computer 110 for controlling the reception of alarm calls and route them to one of the ARC personal having one or more Graphical User Interfaces, GUIs 140, 150 comprising displays 140 for displaying alarm messages and information related to each alarm call or alarm message. A GUI further comprises a phone 150 comprising a microphone and headset or equivalent, for handling voice calls. The central computer 110 routes incoming calls on an voice call input port 160 connected to a PSTN line 162 and data messages on a data input port 170 connected to a data line 172. The central computer is able to handle the incoming data and calls by means of ARC software 120, which is run and executed on a processor that will receive instructions and data from a read-only memory and/or a random access memory.

The ARC software 120 is also configured to handle one or more databases (DBs) 130. The central computer is configured to store data and to collect data from said DBs by means of ARC software 120.

The ARC software 120 routes the data via a data connection 142 to the display 140 and voice calls via a call connection 152 to the phone 150.

The ARC 100 is configured to receive PSTN alarm calls from subscriber devices 310, e.g. a phone, via a PSTN network 300.

The ARC 100 is further configured to receive alarm calls via the Internet 400 transporting and routing data packets, wherein any of the transporter used may be, but not limited to UDP, TCP, SMS, HTTP, FTP, SIP, Serial port, and any of the protocol used may be, but not limited to IP, SIA, SOS_V4, CID, SCAIP, ESPA. The alarm calls are generated by a number of remote connectable devices, such as user equipment (UE), 410, e.g. smartphones and other devices connectable to mobile telecommunications network, fire alarms 420, surveillance devices 430 (both with or without cameras or video cameras), and Internet of Things (IoT) devices 440 configured to send both Voice over IP (VoIP) calls and text message alarm calls.

Many ARCs 100 for personal safety or care are based on technology that expects alarm events to be sent in as two parts.

The data parts generally minimally consist of who have trigged the alarm and what has happened. Additional information like position, text message and such are sometimes added. The "who" part is some kind of identifier that depending on systems and operators which may be called AlarmID, User ID, CallerID, Calling ID, etc. are also common names.

The ARC has a subscriber database 130 with mappings of Subscriber ID to telephone number expected as CallerID.

There are an escalating number of alarm devices on the market, they are utilized by broader groups of people and on a much higher requirement on short time from purchase to fully functional. Many ARC software are not possible to add and remove subscribers without manual steps making it impractical to turn to a broader customer groups that is used to buy a device or service and have it functional within minutes even on weekends.

Also the new type of devices in IoT are often not capable of doing telephone calls in PSTN (Public Switched Telephone Network), but are able to establish voice call over IP, for example SIP or other VoIP technologies. The communication of the data part are also evolving quicker than the ARC software installations manage, making it hard for modern devices to connect to older installations of ARC software.

Thirdly the ARC software license models are often focused on number of subscribers, potentially making the business case for cheap subscriptions for large number of subscribers not feasible.

Figure 2:
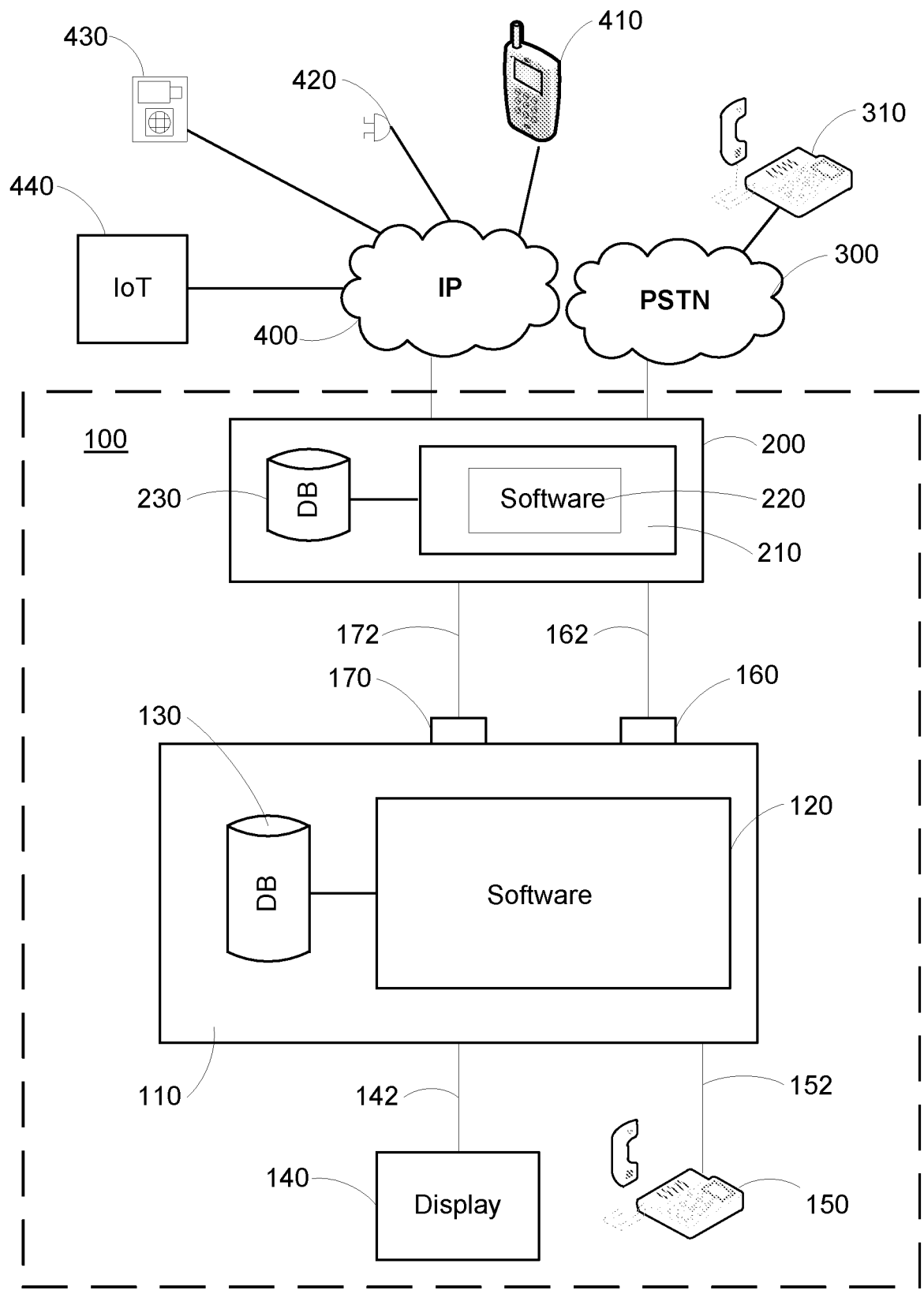
FIG. 2 is a block diagram illustrating an alarm receiving center according to the invention.

FIG. 2 is illustrating an alarm receiving center according to the invention.

One object of the following disclosure is to present solutions of the problems of adapting old alarm receiving equipment of an Alarm Receiving Center (ARC) to more modern alarm sending devices. Said object is achieved by means of a receiving interface device 200 and a method which will be described hereafter in more detail.

A receiving interface device 200, integrated with the ARC 100, is able to handle the incoming data and calls by means of interface software 220, which is run and executed on a processor of a processing circuitry 210 that will receive instructions and data from a read-only memory and/or a random access memory. The receiving interface device 200 could also be considered to be a server application and/or a PSTN interface of an Alarm Receiving Centre, ARC. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially—designed ASICs (Application Specific Integrated Circuits).

The software 220 is also configured to handle one or more databases, DBs, 230. The receiving interface device 200 is configured to store data and to collect data from said DBs by means of interface software 220, which is described and explained here below. With this mapping the software 220 can combine the incoming data message with the incoming telephone call and present them for the ARC personnel in a GUI 140, 150.

Figure 3:
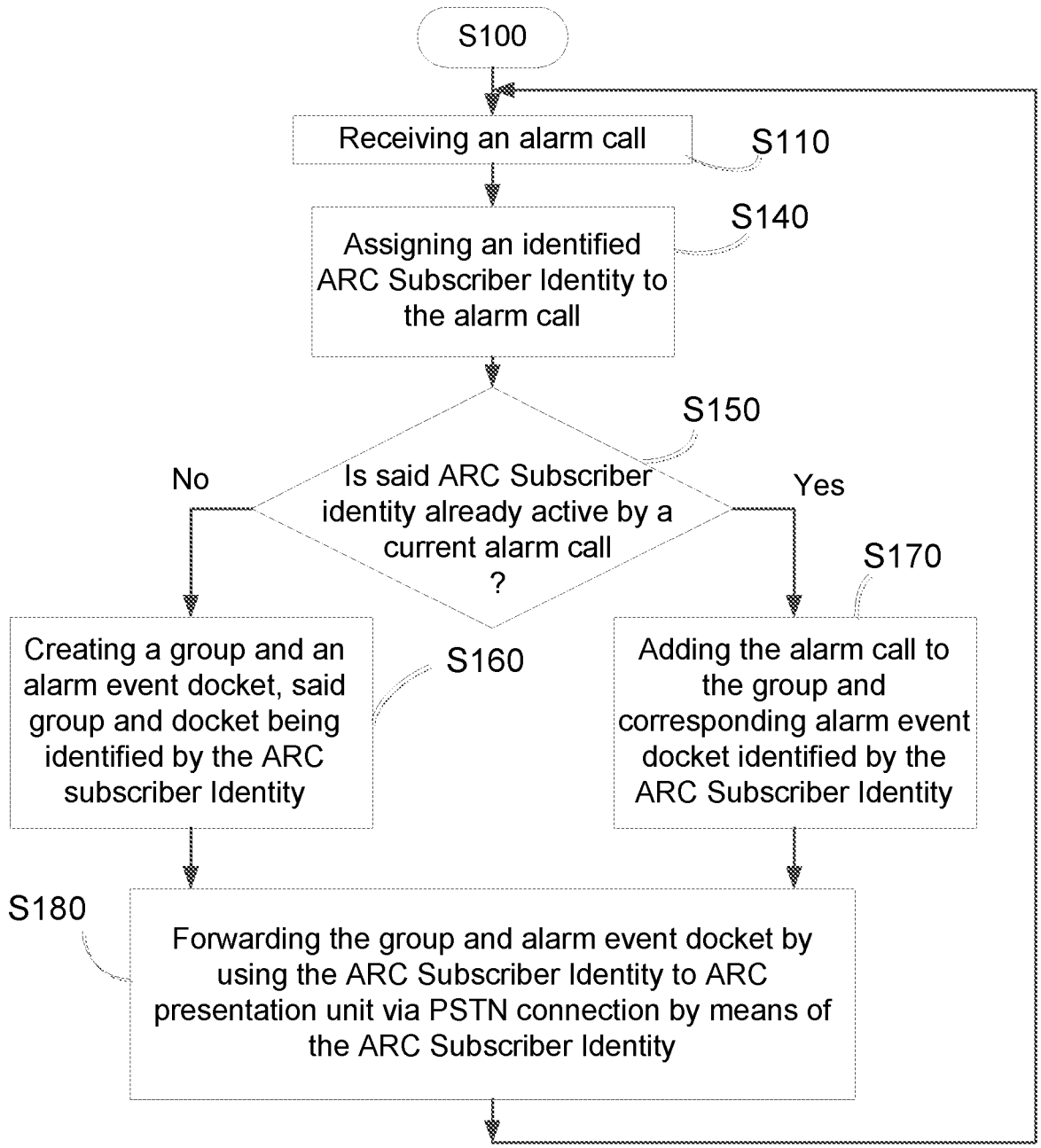
FIG. 3 is a flowchart of a method for grouping received alarm calls.

FIG. 3 is a flowchart of a method for grouping received alarm calls.

The method performed by a server application for grouping received alarm calls generated by or in connection to the same alarm event, said alarm call being a voice call or/and data/text message. Said server application being an PSTN interface of an Alarm Receiving Centre, ARC, for enabling the reception of alarm calls sent by means of VoIP or SIP. The method comprises the steps of:
  receiving (S110) an alarm call;
  assigning (S140) an identified ARC Subscriber Identity to the alarm call;
  checking (S150) if said ARC Subscriber Identity is already active by a current alarm call;
    if ARC subscriber Identity is not active, i.e. in use:
      creating (S160) a group and an alarm event docket, said group and docket being identified by the ARC Subscriber Identity; or,
    if the ARC Subscriber Identity is in use:
      adding (S170) the alarm call to the group and corresponding alarm event docket identified by the ARC Subscriber Identity;

forwarding (S180) the group and alarm event docket by using the ARC Subscriber Identity to ARC staff presentation unit GUI via a PSTN connection by means of the ARC Subscriber Identity.

The method will now be described step by step with reference to FIGS. 2 and 3. The interface device 200 is configured to wait for incoming alarm calls in step S110:

Receiving an alarm call;

In step S110, the receiving interface device 200 is in a standby mode for the method, waiting for an alarm call to be received. When an alarm call is received, the receiving interface device 200 performs S140:

assigning an identified ARC Subscriber Identity to the alarm call.

The received alarm call has a caller identity, which the interface device 200 is configured to check if a corresponding ARC Subscriber Identity in the stored the database 230. The subscriber database 230 comprises mappings of an ARC SubscriberID to telephone number expected as caller identity, CallerID. The interface device 200 is further configured to perform S150:

checking if said ARC Subscriber Identity is already active by a current alarm call.

The interface device 200 is configured to check in the database 230 whether the ARC subscriber Identity is active, i.e. in use, or inactive, i.e. not in use. For each caller identity and subscriber Identity in the database 230 it is recorded whether the ARC subscriber Identity is active, i.e. in use, or inactive, i.e. not in use and when a ARC Subscriber Identity was activated and inactivated. The interface device 200 is configured to update whether the ARC subscriber Identity is active, i.e. in use, or inactive, i.e. not in use and when an ARC Subscriber Identity was activated and inactivated. If the identified ARC subscriber Identity is not in use, No, the interface device 200 is configured to perform step S160:

creating a group and an alarm event docket, said group and docket being identified by the ARC Subscriber Identity.

Thus, the interface device 200 is configured to register an alarm by creating a group and an alarm event docket, said group and alarm event docket being identified by the ARC Subscriber Identity. Said group and alarm event docket are stored by the interface device 200 to be used if a new alarm call is received, S110, which is identified and assigned the same ARC subscriber identity. In that case, when the interface device 200 performs S150 (checking if said ARC Subscriber Identity is already active by a current alarm call?), the result of the test is yes. When the test in S150 is yes, the alarm is already registered in the alarm receiving center by the interface device 200, and the interface device is configured to perform step S170:

adding the alarm call to the group and corresponding alarm event docket identified by the ARC Subscriber Identity.

In this way is every received alarm call grouped to an existing alarm and registered in an alarm event docket by means of the interface device 200. When an received alarm call has been handled by the interface device and organized in a group and alarm event docket, the interface device is configured to perform step S180:

forwarding the alarm call and alarm event docket by using the ARC Subscriber Identity to ARC staff presentation unit GUI via a PSTN connection by means of the ARC Subscriber Identity.

The docket comprises information, e.g. who have trigged the alarm and what has happened. Additional information like position, text message and such are sometimes added to the docket. Said docket is preferably stored in the database 230

Figure 4:
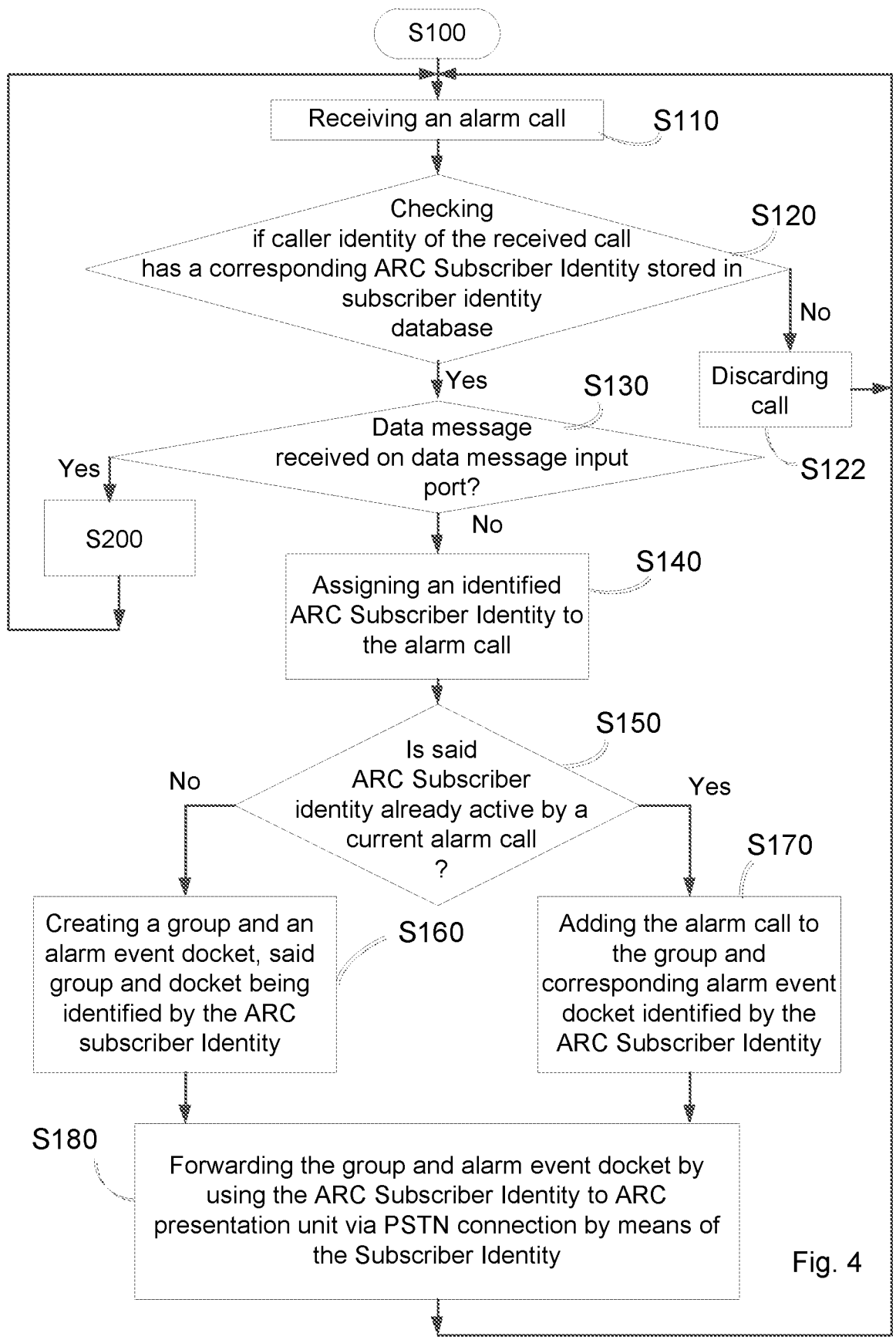
FIG. 4 is a flowchart of an embodiment of the method for grouping received alarm calls.

FIG. 4 is a flowchart of an embodiment of the method for grouping received alarm calls.

The method comprises the steps of:

receiving (S110) an alarm call;

checking (S120) if caller identity of the received alarm call has a corresponding ARC Subscriber Identity stored in an ARC Subscriber Identity database;

If no ARC subscriber identity is found (no):
discarding (S122) the call;

or if a corresponding ARC subscriber identity is found (yes):

checking (S130) if data message is received on a data message input port;

If data message is received (yes):
perform a method (S200) for handling data messages received on data message input port;

Or if data message is not received (no):

assigning (S140) an identified ARC Subscriber Identity to the alarm call;

checking (S150) if said ARC Subscriber Identity is already active by a current alarm call;

If ARC subscriber Identity is not active, i.e. in use:
creating (S160) a group and an alarm event docket, said group and docket being identified by the ARC Subscriber Identity; or, if the ARC Subscriber Identity is in use:
adding (S170) the alarm call to the group and corresponding alarm event docket identified by the ARC Subscriber Identity;

forwarding (S180) the group and alarm event docket by using the ARC Subscriber Identity to ARC staff presentation unit GUI via a PSTN connection by means of the ARC Subscriber Identity.

The method will now be described step by step with reference to FIGS. 2 and 4. The interface device 200 is configured to wait for incoming alarm calls in step S110:

Receiving an alarm call;

In step S110, the receiving interface device 200 is in a standby mode for the method, waiting for an alarm call to be received. When an alarm call is received, the receiving interface device 200 performs S120:

Checking if caller identity of the received alarm call has a corresponding ARC Subscriber Identity stored in an ARC Subscriber Identity database.

The received alarm call has a caller identity, which the interface device 200 is configured to check if a corresponding Subscriber Identity in the stored the database 230. The subscriber database 230 comprises mappings of an ARC SubscriberID to a telephone number expected to be a caller identity, CallerID. If no ARC subscriber identity is found, No, the interface device 200 is configured to perform S122:

discarding the call.

If a corresponding ARC subscriber identity is found, yes, the interface device 200 is configured to perform S130:

checking if data message is received on a data message input port.

If data message is received on a data message input port, yes, the interface device 200 is configured to perform a method S200. Or if data message is not received, No, the interface device 200 is configured to perform S140:

assigning an identified ARC Subscriber Identity to the alarm call.

The interface device 200 is further configured to perform S150:

checking if said Subscriber Identity is already active by a current alarm call.

The interface device 200 is configured to check in the database 230 whether the ARC subscriber Identity is active, i.e. in use, or inactive, i.e. not in use. For each caller identity and ARC subscriber Identity in the database 230 it is recorded whether the ARC subscriber Identity is active, i.e. in use, or inactive, i.e. not in use and when an ARC Subscriber Identity was activated and inactivated. The interface device 200 is configured to update whether the ARC subscriber Identity is active, i.e. in use, or inactive, i.e. not in use and when an ARC Subscriber Identity was activated and inactivated. If the identified subscriber Identity is not in use, No, the interface device 200 is configured to perform step S160:

creating a group and an alarm event docket, said group being identified by the ARC Subscriber Identity.

Thus, the interface device 200 is configured to register an alarm by creating a group and an alarm event docket, said group and alarm event docket being identified by the ARC Subscriber Identity. Said group and alarm event docket are stored by the interface device 200 to be used if a new alarm call is received, S110, which is identified and assigned the same ARC subscriber identity. In that case, when the interface device 200 performs S150 (checking if said ARC Subscriber Identity is already active by a current alarm call?), the result of the test is yes. When the test in S150 is yes, the alarm is already registered in the alarm receiving center by the interface device 200, and the interface device is configured to perform step S170:

adding the alarm call to the group and corresponding alarm event docket identified by the Subscriber Identity.

In this way is every received alarm call grouped to an existing alarm and registered in an alarm event docket by means of the interface device 200. When a received alarm call has been handled by the interface device and organized in a group and alarm event docket, the interface device is configured to perform step S180:

forwarding the group and alarm event docket by using the ARC Subscriber Identity to ARC staff presentation unit GUI via a PSTN connection by means of the ARC Subscriber Identity.

Thus, with this mapping and grouping of the incoming data message and the incoming telephone call and present them for the ARC personnel in the GUI 140, 150.

Figure 5:
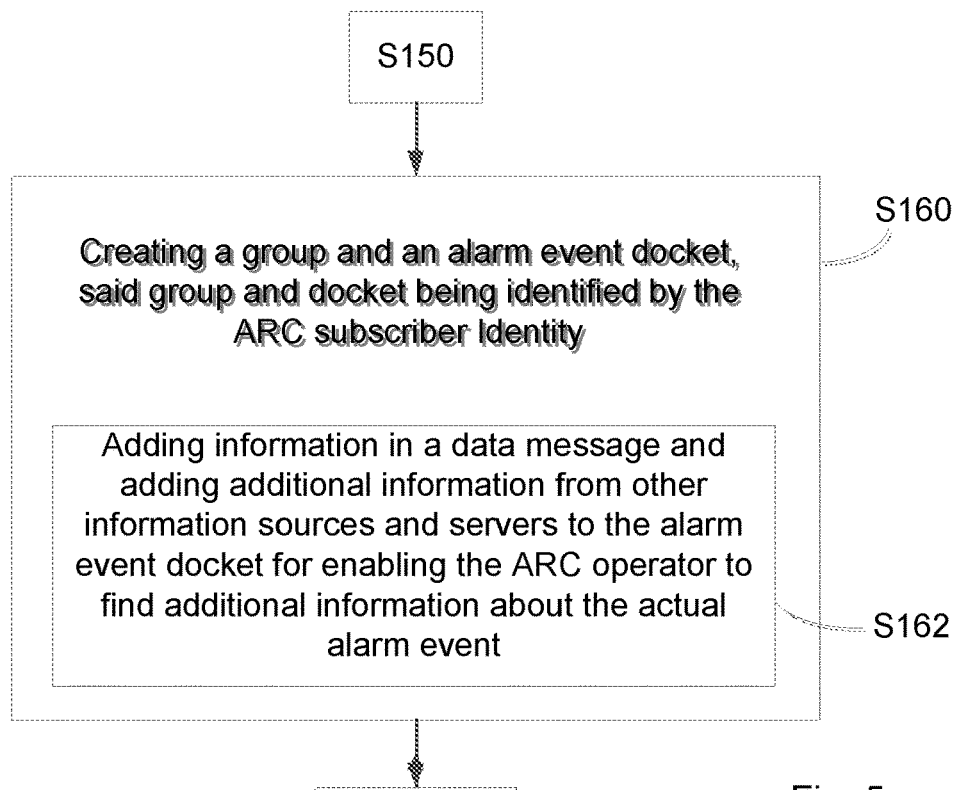
FIG. 5 is a flowchart illustrating an embodiment of step S160 in the invented method.

FIG. 5 is a flowchart illustrating an embodiment of step S160 in the invented method. Said step S160 is situated between step S150 and S180 as illustrated in FIG. 5.

The method may further comprise, if the alarm call comprises an alarm message, then at creating, S160, a group and an alarm event docket, the step S162 is performed:

adding information in an alarm message and additional information from other information sources and servers to the alarm event docket for enabling the ARC operator to find additional information about the actual alarm event.

The receiving interface device 200 is therefore configured to add information from an alarm message belonging to the ARC subscriber identity and additional information belonging to the ARC subscriber identity from information sources and servers to the alarm event docket for enabling the ARC operator to find additional information about the actual alarm event. Some ARC subscriber identity in the database 220 is stored together with one or more addresses and/or links to information sources and servers having additional information about the caller of an alarm call. The interface device 200 is configured to use said links and addresses to be able to get said information.

Figure 6:
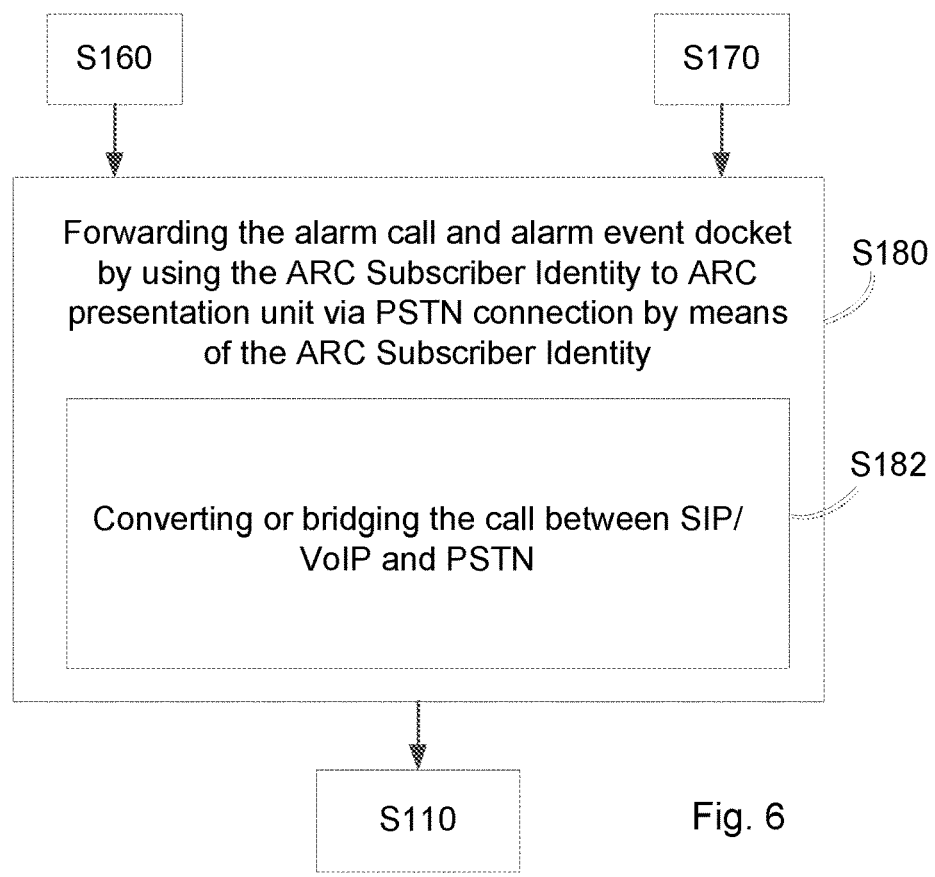
FIG. 6 is a flowchart illustrating an embodiment of step S180 in the invented method.

FIG. 6 is a flowchart illustrating an embodiment of step S180 in the invented method. Said step S180 is situated between steps S160, S170 and S110 as illustrated in FIG. 6.

The step of forwarding, S180, the group and alarm event docket may further comprise a step 182:

Converting or bridging the alarm call between SIP/voip and PSTN formats.

The interface device 200 is configured to convert or bridge the alarm call between Session Initiation Protocol supported voice over IP (SIP/voip) format and Public Switched Telephone Network format (PSTN).

The interface device 200 may be configured to route a received call through a certain line 162 or 172 to the central computer 110 (see FIG. 2), by changing the A-number of the call, such as the CallID or DialerID, to match the expected CallID or DialerID for the used ARC Subscriber ID for the specific alarm event.

Figure 7:
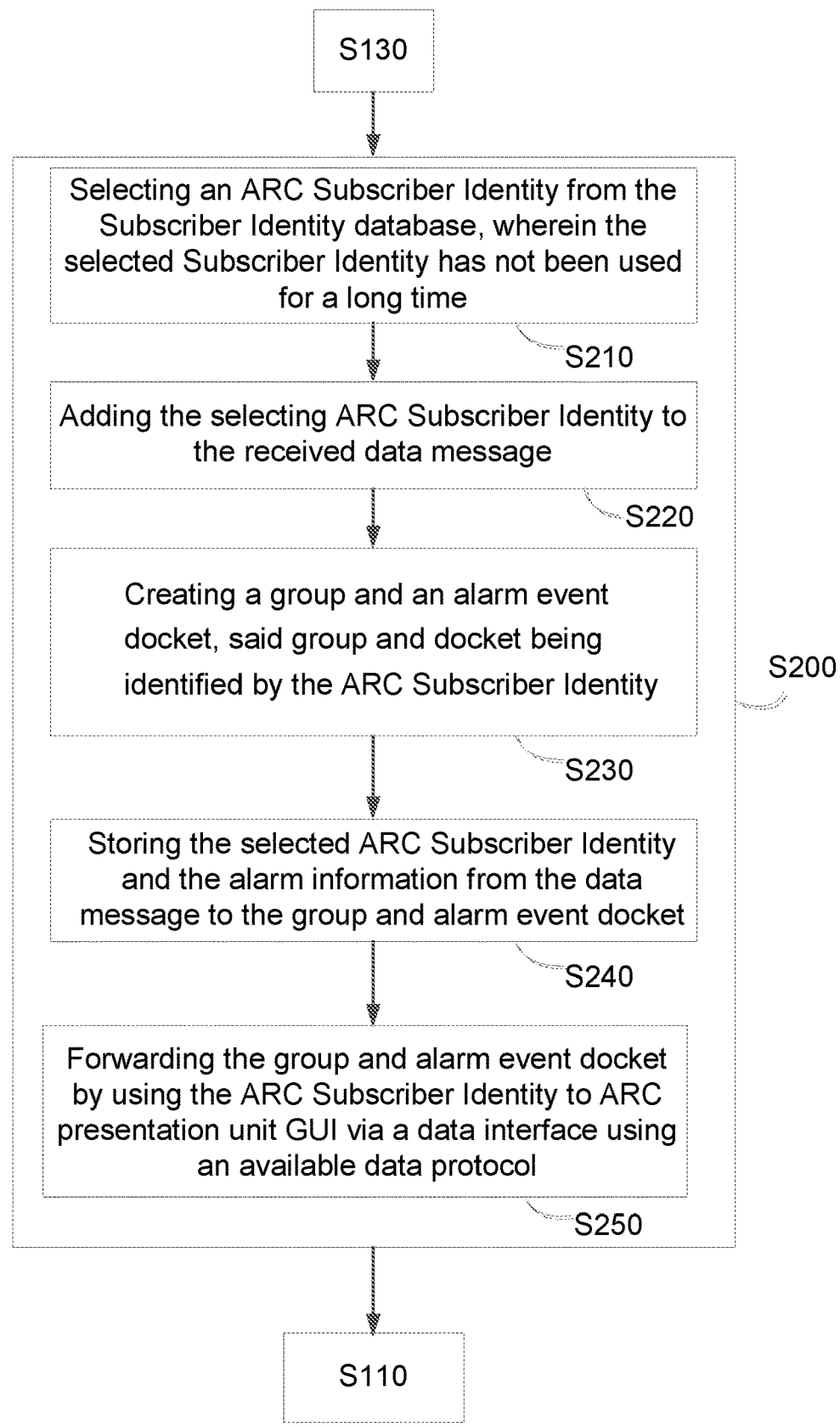
FIG. 7 is a flowchart of a method S200 for handling data messages received on data message input port.

FIG. 7 is a flowchart of a method S200 for handling data messages received on data message input port, said method comprising the steps of:

Selecting (S210) an ARC Subscriber Identity from the ARC Subscriber Identity database, wherein the selected ARC Subscriber Identity has not been used for a long time;

Adding (S220) the selected ARC Subscriber Identity to the received data message;

creating (S230) a group and an alarm event docket, said group and docket being identified by the ARC Subscriber Identity Storing (S240) the select ARC Subscriber Identity and the alarm information from the alarm message to the group and an alarm event docket;

forwarding (S250) the group and alarm event docket by using the ARC Subscriber Identity to ARC operator presentation unit GUI via a data interface using an available data protocol.

The method will now be described step by step with reference to FIGS. 2 and 7.

As the data message does not contain any regular CallerID, the interface device 200 is not able to find a corresponding ARC Subscriber ID in the database 230 of the ARC Subscriber ID. The interface device 200 is configured to perform step S210:

Selecting an ARC Subscriber Identity from the ARC Subscriber Identity database, wherein the selected ARC Subscriber Identity has not been used for a long time.

The interface device S200 is configured to search for an ARC Subscriber Identity in the database 230. For each ARC subscriber Identity in the database 230, it is recorded whether the ARC subscriber Identity is active, i.e. in use, or inactive, i.e. not in use and when an ARC Subscriber Identity was activated and inactivated. Thus, the interface device S200 is configured to select the ARC subscriber identity that has been inactivated for a time, e.g. such as a day. The longer time the ARC subscriber identity has been inactivated the better it is. A long time without being used is an indication that the ARC Subscriber Identity is more or less free to use.

The interface device S200 is then configured to perform steps S220 and S230:
  Adding the selected ARC Subscriber Identity to the received data message;
  Creating a group and an alarm event docket, said group and docket being identified by the ARC Subscriber Identity.

Thus, the interface device 200 is configured to register the received data message by creating a group and an alarm event docket, said group and alarm event docket being identified by the ARC Subscriber Identity.

The interface device S200 is then configured to perform step S240:
  Storing the select ARC Subscriber Identity and the alarm information from the alarm message to a group and an alarm event docket.

Said group and alarm event docket are stored by the interface device 200 in the database 230.
  forwarding (S250) the group and alarm event docket by using the ARC Subscriber Identity to ARC operator presentation unit GUI via a data interface using an available data protocol.

Thus, with this mapping and grouping of the incoming data message, it is forwarded via the central computer 110 and presented for the ARC personnel in the GUIs 140, 150.

The invention may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially—designed ASICs (Application Specific Integrated Circuits).

It is therefore provided a receiving interface device 200 configured to perform a method S100 for grouping received alarm calls generated by or in connection to the same alarm event. Said alarm call is a voice call or/and data/text message, and said receiving interface device 200 is a part of an Alarm Receiving Centre, ARC, 100 for enabling the reception of alarm calls sent by means of VoIP or SIP. Said receiving interface device comprises said device comprising a processor in a processing circuitry 210 being operative to perform the steps of the method S100 as described above.

It is further provided a computer program comprising computer program code which, when run in a processor of a receiving interface device being a part of an Alarm Receiving Centre, ARC, 100 causes the ARC to perform the steps of the method S100 as described above.

A computer program product storing a computer program comprising computer program code which, when run in a processor of a receiving interface device being a part of an Alarm Receiving Centre, ARC, 100 causes the ARC to perform the steps of the method S100 as described above.

A number of embodiments of the present invention have been described. It will be understood that various modifications may be made without departing from the scope of the invention. Therefore, other implementations are within the scope of the following claims defining the invention.

Abbreviation List

ASIC Application Specific Integrated Circuit
ARC Alarm Receiving Center
CD-ROM Compact Disc Read-Only Memory
CID Content Interactive Delivery
DB Database
EEPROM Electrically Erasable Programmable Read Only Memory
EPROM Erasable Programmable Read Only Memory
ESPA European Selective Paging manufacturers Association
FTP File Transfer Protocol
GUI Graphical User Interface
HTTP Hypertext Transfer Protocol
IoT Internet of Things
IP Internet Protocol
PSTN Public Switched Telephone Network
SCAIP Social Care Alarm Internet Protocol
SIA Security Industry Association
SIP Session Initiation Protocol
SMS Short Message Service
SOS_v4 SOS Access v4
TCP Transmission Control Protocol
UDP User Datagram Protocol
VoIP Voice over Internet Protocol

The invention claimed is:

1. A method for grouping received alarm calls generated by or in connection to an alarm event, each alarm call being a voice call and/or data message and/or text message, said method being performed by an Alarm Receiving Centre, ARC, for enabling the reception of alarm calls sent by means of Voice over Internet Protocol, VoIP, or Session Initiation Protocol, SIP, wherein said method comprises the steps of:
  receiving an alarm call;
  assigning an identified ARC Subscriber Identity to the alarm call;
  checking if said ARC Subscriber Identity is already active by a current alarm call;
    if ARC Subscriber Identity is not in use:
      creating a group and an alarm event docket, said group and docket being identified by the ARC Subscriber Identity;
    or if the ARC Subscriber Identity is in use:
      adding the alarm call to the group and corresponding alarm event docket identified by the ARC Subscriber Identity;
  forwarding the group and alarm event docket by using the ARC Subscriber Identity to an ARC staff presentation unit Graphical User Interface, GUI, via a Public Switched Telephone Network, PSTN, connection by means of the ARC Subscriber Identity.

2. The method according to claim 1, wherein the method further comprises the steps of:

checking if a caller identity of the received alarm call has a corresponding ARC Subscriber Identity stored in an ARC Subscriber Identity database, and;

if no ARC subscriber identity is found:

discarding the call, or if a corresponding ARC subscriber identity is found:

checking if a data message is received on a data message input port.

3. The method according to claim 2, wherein a corresponding ARC Subscriber Identity is found and checking if the data message is received on a data message input port is performed, wherein the method further comprises:

if a data message is received:

performing a method for handling data messages received on the data message input port;

or if a data message is not received:

assigning an identified ARC Subscriber Identity to the alarm call.

4. The method according to claim 3, wherein the method for handling data messages received on the data message input port comprises:

selecting an ARC Subscriber Identity from the ARC Subscriber Identity database, wherein the selected ARC Subscriber Identity has not been used for a long time;

adding the selected ARC Subscriber Identity to the received data message;

creating a group and an alarm event docket, said group and docket being identified by the ARC Subscriber Identity;

storing the select ARC Subscriber Identity and the alarm information from the data message to the group and an alarm event docket;

forwarding the group and alarm event docket by using the ARC Subscriber Identity to the ARC staff presentation unit GUI via a data interface using an available data protocol.

5. The method according to claim 1, wherein if the alarm call comprises an alarm message, then creating a group and an alarm event docket comprises:

adding information in an alarm message and additional information from other information sources and servers to the alarm event docket for enabling an ARC operator to find additional information about the alarm event.

6. The method according to claim 1, wherein the step of forwarding the group and alarm event docket further comprise:

converting or bridging the alarm call between SIP, VoIP and PSTN formats.

7. The method according to claim 1, wherein the alarm call is transmitted using a User Datagram Protocol (UDP), a Transmission Control Protocol (TCP), a Short Message Service (SMS), a Hypertext Transfer Protocol (HTTP), a File Transfer Protocol (FTP), a Session Initiation Protocol (SIP), a serial port a Security Industry Association (SIA) protocol, an SOS Access v4 (SOS_V4) protocol, a Content Interactive Delivery (CID) protocol, a Social Care Alarm Internet Protocol (SCAIP), or a European Selective Paging manufacturers Association (ESPA) protocol.

8. A receiving interface device configured to perform a method for grouping received alarm calls generated by or in connection to an alarm event, each alarm call being a voice call and/or data message and/or text message, said receiving interface device being a part of an Alarm Receiving Centre, ARC, for enabling the reception of alarm calls sent by means of VoIP or SIP, wherein said receiving interface device comprises a processor in a processing circuitry being operative to perform the steps of the method according to claim 1.

9. A computer program comprising computer program code which, when run in a processor of a receiving interface device being a part of an Alarm Receiving Centre, ARC, causes the ARC to perform the steps of the method according to claim 1.

10. A computer program product storing a computer program comprising computer program code which, when run in a processor of a receiving interface device being a part of an Alarm Receiving Centre, ARC, causes the ARC to perform the steps of the method according to claim 1.

* * * * *